Dec. 7, 1943.  L. JEX-B. FORBES ET AL  2,336,170
APPARATUS FOR TEMPERING GLASS
Filed May 17, 1939  3 Sheets-Sheet 1

Inventors
Lewis J-B Forbes
James Heaton
Dorey Cole & Garris
Attorneys

Dec. 7, 1943. L. JEX-B. FORBES ET AL 2,336,170
APPARATUS FOR TEMPERING GLASS
Filed May 17, 1939 3 Sheets-Sheet 2

Inventors
Lewis J-B Forbes
James Heaton
Owsey Cole & Garner
Attorneys

Dec. 7, 1943.  L. JEX-B. FORBES ET AL  2,336,170
APPARATUS FOR TEMPERING GLASS
Filed May 17, 1939   3 Sheets-Sheet 3
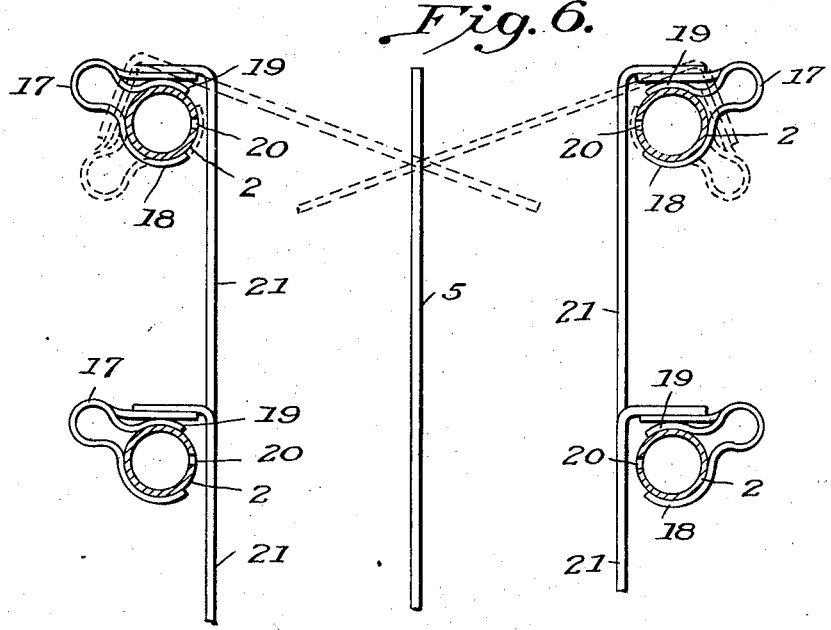
Fig. 6.
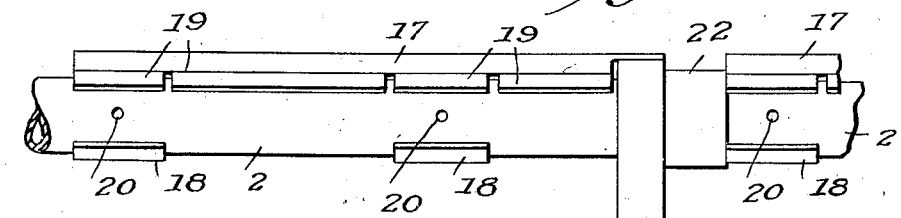
Fig. 7.
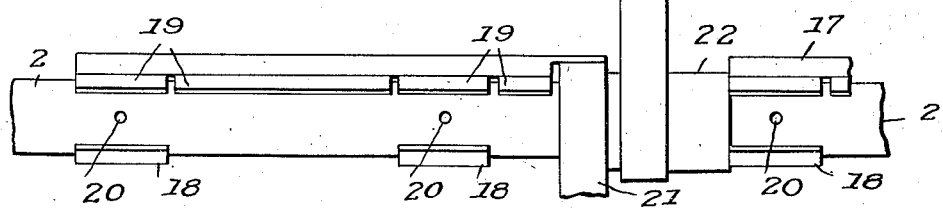

Patented Dec. 7, 1943

2,336,170

UNITED STATES PATENT OFFICE 2,336,170

APPARATUS FOR TEMPERING GLASS

Lewis Jex-Blake Forbes, Rainhill, and James Heaton, St. Helens, England, assignors to The American Securit Company, Washington, D. C., a company of Delaware Application May 17, 1939, Serial No. 274,274
In Great Britain May 20, 1938

1 Claim. (Cl. 49—45)

This invention relates to apparatus for tempering glass and has for its object a blowing apparatus provided with means for cutting off the chilling medium from portions of the apparatus and with means for preventing a sheet of glass being introduced into those portions of the apparatus from which the chilling medium has been cut off.

The invention is applicable to that form of tempering apparatus in which the glass is loaded at a loading station and is then moved into the blowing apparatus and from thence into the furnace and, after heating, is again brought into the blowing apparatus to be chilled, the blowing apparatus consisting of two frames, each having a plurality of tubes and each tube having a plurality of jet orifices, and devices for shutting off the chilling medium from a portion of the plurality of jet orifices.

According to the invention, a member is adapted to be placed in the path of movement of the glass sheets and means, interlocked with the shutting off devices, are provided for so placing the member that it obstructs the movement of any glass sheet which otherwise would enter a portion of the blowing apparatus from which the cooling medium has been shut off. Further, in an apparatus having horizontal tubes, when the member is placed close below the level of the bottom edge of a given glass sheet, the interlocking means prevent the member being moved below the level of the highest tube of which the valves are closed. Alternatively, a plurality of members adapted to be placed in the path of movement of the glass sheets are connected with devices for shutting off the chilling medium at some of the jet orifices, so that each member obstructs the movement of a glass sheet into a portion of the blowing apparatus, in which the chilling medium has been shut off at the jet orifices.

In the accompanying drawings:

Figure 6 is a vertical cross section (on the line B—B of Figure 5) on a larger scale showing a portion of the latter device; and Figure 7 is a view of a portion of one tube fitted with the device seen from the centre plane of the blowing apparatus.

Figure 1:
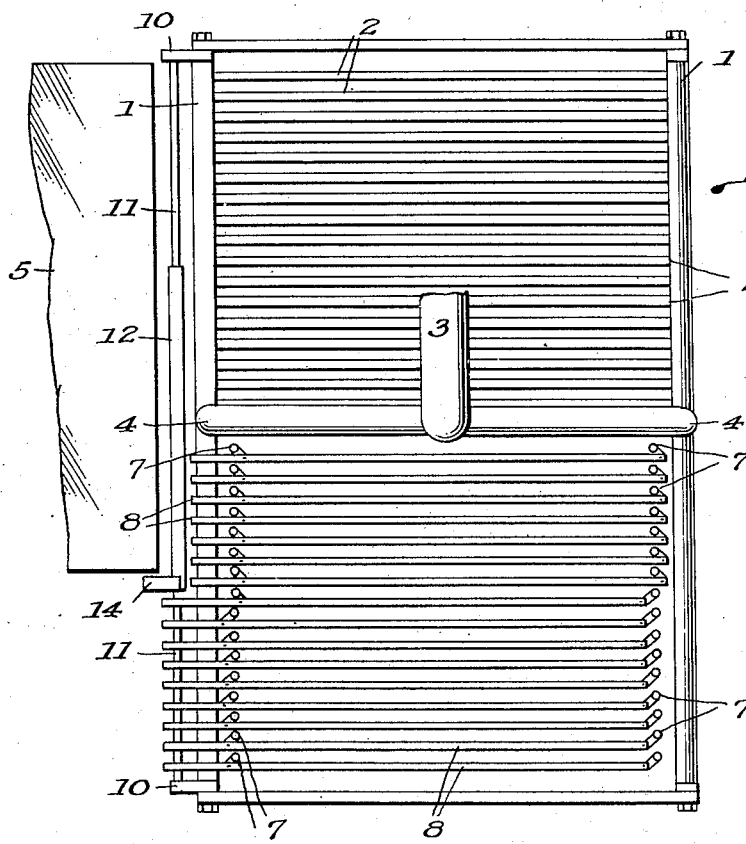
Figure 1 is an elevation of a blowing frame, the upper portion of which illustrates only the blowing tubes, and the lower portion of which illustrates only the actuating mechanism for the valves.
Figure 2:
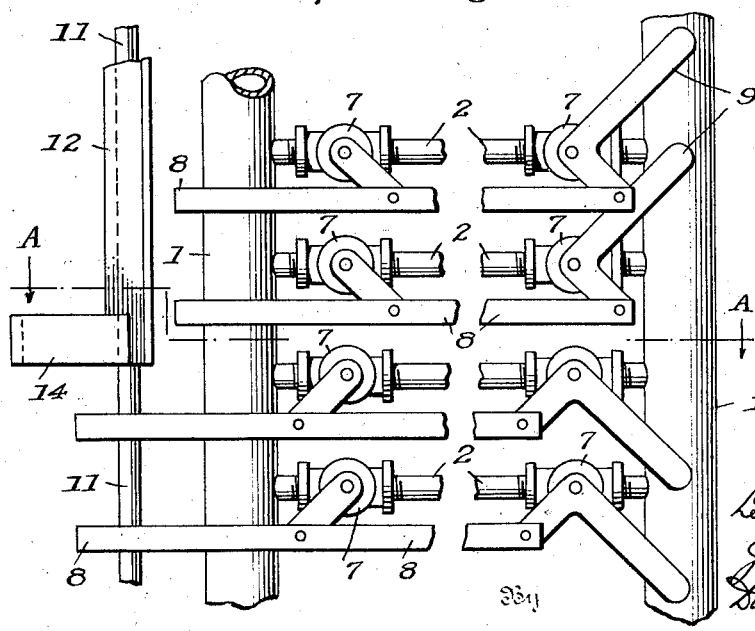
Figure 2 is an elevation on a larger scale of a portion of Figure 1 illustrating several of the blowing tubes and their valves and the mechanism for compelling the opening of the valves before a sheet of glass of larger dimensions than previously treated, can be introduced between the blowing frames.
Figure 3:
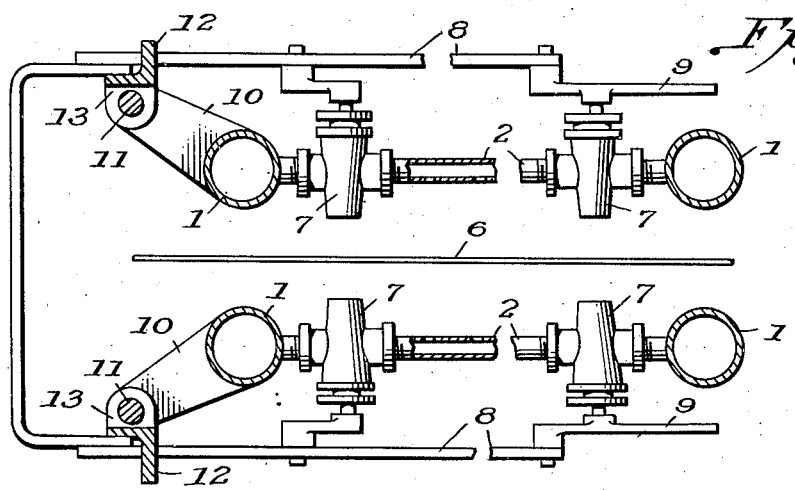
Figure 3 is a section along the line A—A of Figure 2.

Referring to Figures 1, 2 and 3, the blowing apparatus consists of two oppositely disposed frames, each consisting of two vertical headers 1, supplying a plurality of horizontal tubes 2. The tubes 2 are seen in the upper half of Figure 1, and are continued to the bottom of the headers, but are omitted from the lower half for the sake of clearness in the drawings. Each tube 2 has a plurality of jet orifices, the spacing of the jet orifices being commonly equal to the spacing of the tubes. The two headers 1 are supplied with chilling medium by the pipe 3 and cross pipe 4. The glass sheet 5 is transferred from a loading station to the left of the blowing frame, into a position between the two blowing frames and from there is moved into the furnace, which may be either below the blowing frames or to the right of them. The centre line 6 in Figure 3 indicates the path of the glass sheet.

The blower tubes 2 are each provided with two valves 7 whereby the supply of chilling medium from the two headers 1 may be shut off. In the apparatus shown, about half the tubes 2 may be shut off from the headers, so that glass sheets of height down to about half the maximum height may be tempered without waste of chilling medium.

Now when a number of tubes 2 have been shut off to suit glass sheets of a certain height, and a succession of sheets of this height is followed by a sheet of greater height, it has been found that the operator may not notice the increase in height or may forget to open the valves 7 to those tubes 2 which are needed to chill the sheet of greater height. In such event the sheet of greater height is not tempered throughout. The devices which are the object of the invention are for the purpose of obviating inadvertences or forgetfulness on the part of the operator and so prevent waste in manufacture.

The two valves 7 at the end of a tube 2 are connected together by a bar 8, so that, when the arm 9 on a valve 7 at the right (Figure 2) is depressed to close the valve, the valve at the left is also closed, and the bar 8 is moved to the left. In Figure 2, the valves 7 on the two lower tubes 2 are closed and those on the two upper tubes are open.

Brackets 10, fixed to the ends of the left hand headers 1, support rods 11. A vertical angle iron 12, provided with lugs 13 is adapted to slide up and down each rod 11, the two angle irons 12 being connected by the bent bar 14, hereinafter called the guard rail. The guard rail 14 may be moved to any position, the lugs 13 sliding along the rods 11 and remaining in position by friction.

The bars 8 are so placed with reference to the angle irons 12, and guard rail 14, that the angle irons obstruct the movement to the left of those bars 8 which are above the guard rail. Thereby, the valves 7 on those tubes 2 which are above the guard rail 14 cannot be closed. Referring to Figure 1, if the glass sheet 5 be brought into a position above the guard rail 14 and the guard rail be moved upwards until it is close to the bottom edge of the sheet, the valves 7 on the tubes which are not needed for chilling the sheet (the nine lowest) can be closed, but the valves on the tubes needed for chilling the sheet cannot be closed.

If now, after the sheet 5 has been tempered, a sheet of greater height is brought to the frame, this will strike the guard rail 14, unless the operator has opened the valves on the lower tubes necessary for chilling it, and has lowered the guard rail. The guard rail 14, moreover, cannot be lowered until the valves 7 on the tubes 2 below it have been opened so as to move the bars 8 to the right, out of the path of the angle irons 12.

Figure 4:
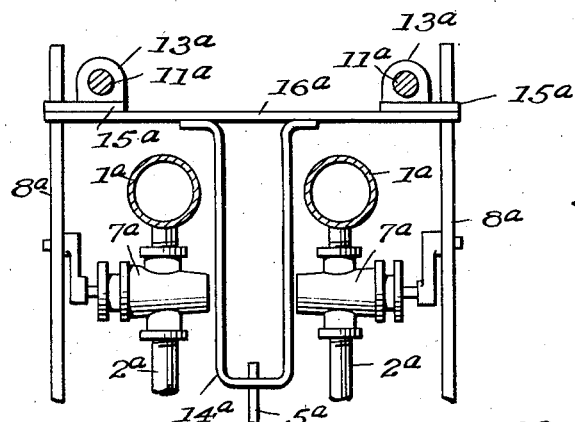
Figure 4 is a section similar to Figure 3 of the device shown in Figures 1, 2 and 3 adapted to a blowing frame with vertical blowing tubes.

Figure 4 shows a slightly modified form of the device applied to a blowing apparatus in which the jet tubes 2ª are vertical and the headers 1ª horizontal. It is applicable to apparatus in which the glass sheet is moved from the blowing apparatus downwards into the furnace. The two rods 11ª are horizontal, above the headers 1ª and the lugs 13ª carry bars 15ª connected by bar 16ª to which the guard rail 14ª is attached. The guard rail descends between the blowing frames so as to lie in the path of the sheet 5ª. Valves 7ª admit and cut off the admission of chilling fluid to the tube 2ª. The valves of each tube are connected by the bars 8ª. The operation of the device is similar to that described with reference to Figures 1, 2 and 3.

Figure 5:
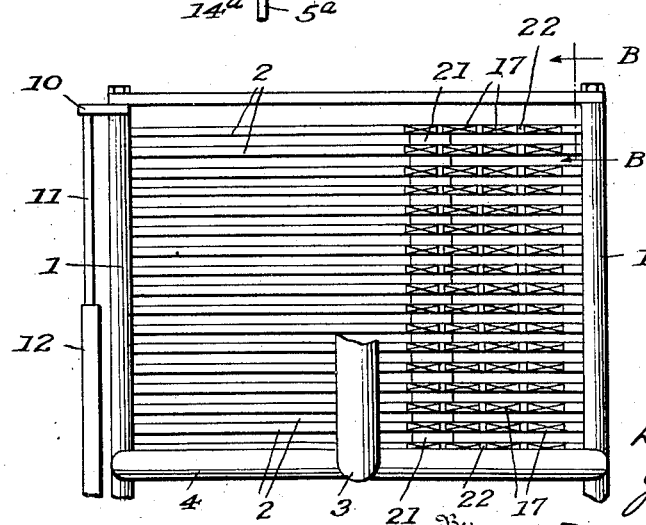
Figure 5 is a view of the upper part of the frame shown in Figure 1 fitted with another form of device.

An alternative form of device is shown in Figures 5, 6 and 7, applicable to cases in which it is desired to shut off the chilling medium from a part of each tube in a frame with horizontal jet tubes. Shut off valves are undesirable for this purpose, because unless each tube is supplied from both ends, there is an undue variation in pressure in the jet tubes. The device, therefore operates to close jet orifices in the tubes. It is shown in Figure 5 applied to the upper part of frame as in Figure 1, and a frame so constructed enables narrow sheets as well as sheets of small height to be chilled without undue waste of chilling medium.

Each tube 2 in the upper part of the frame has embracing it four spring steel clips 17. Each clip 17 has two lips 18 and 19, between which about one quarter of the periphery of the tube is exposed. Figure 6 is a vertical section of the blowing apparatus, showing only two tubes 2 of the left hand and right hand blowing frames.

In Figure 6 the full line positions show the jets 20 open for the blowing operation and the tongues 21 out of the path of the sheet. The dotted line positions show the jets 20 closed and the tongues 21 in a position where they will contact with the sheet, thus bringing the operator's attention to the fact that the jets 20 are closed and should be opened to permit the presentation of a sheet of larger dimension between the extra blowing tubes. Each clip is shown adapted to cover two jet orifices 20, of a single tube so that the orifices can be opened or closed in pairs. At one end of each clip 17 a long tongue 21 is attached, which when the clip is turned to open the jet orifices 20 takes up the position shown on the left and right of Figure 6. When the orifices are closed, the tongues 21 extend into the path of sheet of glass 5, and prevent the sheet being moved into a position in which any portion of it lies between closed orifices. In practice, orifices facing one another are always either both closed or both open. In Figure 5, the clips 17 are shown diagrammatically, each by a rectangle with two diagonals. The two left hand clips on each tube 2 are understood to be in a position in which the orifices are open and the two right hand clips in a position in which the orifices are closed. One clip 17 is separated from the adjacent clip by a collar 22.

When it is desired to close the orifices which are not needed to chill a sheet, the sheet is brought into position between the blowing frames, and then unneeded orifices are closed by turning the clips 17. If, through inadvertence, a clip is turned to close orifices which are needed, the operator's attention is called by the tongue 21 striking the sheet.

Having described our invention, we declare that what we claim and desire to secure by Letters Patent is:

In apparatus for tempering glass sheets, the combination of a plurality of oppositely disposed blowing units each including a plurality of tubes having a series of nozzles, a valve for admitting and excluding air from each of said tubes, a movable element adjacent the entrance end of the blowing units and placed in the path of movement of the sheet of glass to said units, an arm extending from each of said valves into the path of movement of said element when said valves are closed and movable out of the path of movement of the element whereupon the valves are opened so as to permit a movement of the element to admit the sheet of glass to the blowing units.

LEWIS JEX-BLAKE FORBES.
JAMES HEATON.